(12) United States Patent
Bailey

(10) Patent No.: US 12,239,246 B1
(45) Date of Patent: Mar. 4, 2025

(54) HYGIENIC, CUSTOMER-FRIENDLY SMART DINING TABLE

(71) Applicant: Maurice Bailey, Hoschton, GA (US)

(72) Inventor: Maurice Bailey, Hoschton, GA (US)

( * ) Notice: Subject to any disclaimer, the term of this patent is extended or adjusted under 35 U.S.C. 154(b) by 0 days.

(21) Appl. No.: 18/801,366

(22) Filed: Aug. 12, 2024

(51) Int. Cl.
*A47F 10/06* (2006.01)
*A47F 10/02* (2006.01)
*G06Q 20/18* (2012.01)
*G06Q 50/12* (2012.01)

(52) U.S. Cl.
CPC .............. *A47F 10/06* (2013.01); *A47F 10/02* (2013.01); *G06Q 20/18* (2013.01); *G06Q 50/12* (2013.01)

(58) Field of Classification Search
CPC ......... A47F 10/06; A47F 10/02; G06Q 20/18; G06Q 50/12
See application file for complete search history.

(56) References Cited

U.S. PATENT DOCUMENTS

| | | | | |
|---|---|---|---|---|
| 9,384,495 | B1 * | 7/2016 | Cope ................... | H04B 10/11 |
| 11,556,298 | B1 * | 1/2023 | Seger, Jr. ............. | G06F 3/0446 |
| 2002/0149239 | A1 * | 10/2002 | Koljonen ............. | A47C 7/72 |
| | | | | 297/184.14 |
| 2006/0112335 | A1 * | 5/2006 | Hofmeister .......... | G06F 3/0488 |
| | | | | 715/701 |
| 2011/0218867 | A1 * | 9/2011 | Cerrato ............... | G06Q 50/12 |
| | | | | 705/15 |
| 2012/0251756 | A1 * | 10/2012 | Buckley .............. | C09J 7/29 |
| | | | | 427/289 |
| 2019/0102830 | A1 * | 4/2019 | Yin .................... | G06Q 20/3276 |

FOREIGN PATENT DOCUMENTS

| | | |
|---|---|---|
| CN | 101785603 A | 7/2010 |
| CN | 202179281 U | 4/2012 |
| CN | 202908152 U | 5/2013 |
| CN | 203073610 U | 7/2013 |
| CN | 203118057 U | 8/2013 |
| CN | 203290444 U | 11/2013 |
| CN | 204734096 U | 11/2015 |
| CN | 105224901 A | 1/2016 |
| CN | 106805500 A | 6/2017 |
| CN | 219330986 U | 7/2023 |
| CN | 118069091 A | 5/2024 |

OTHER PUBLICATIONS

Spence, Charles, et al. "Technology at the dining table." Flavor, 2013, vol. 2-16. https://doi.org/10.1186/2044-7248-2-16.

* cited by examiner

*Primary Examiner* — A. Hunter Wilder
(74) *Attorney, Agent, or Firm* — Abhijit B. Sadananda

(57) ABSTRACT

Various versions of a customer-friendly smart dining table are disclosed for streamlining all processes and meeting customer needs and interests from food ordering to delivery directly on the table. The table comprises an interactive interface capable of receiving touch-based inputs, voice-based inputs, or both from patron(s) and displaying output(s) respectively. The interface may comprise a feedback module to provide automated assistance to the patron(s) in food selection and customization of the menu, an order management module to allow the patron(s) to place food orders, a payment module to enable the patron(s) to complete payments directly from the table, a power management module to manage power usage and ambient lighting, and a leisure module to interact with various entertainment options. The interface has antimicrobial properties to maintain the hygiene of the smart dining table.

16 Claims, 10 Drawing Sheets

HYGIENIC, CUSTOMER-FRIENDLY SMART DINING TABLE

TECHNICAL FIELD

The present invention relates to the field of smart tables. More specifically, the present invention relates to the field of smart dining tables. Even more specifically, the present invention relates to a customer-friendly smart dining table for automating and streamlining all food ordering processes in restaurants and meeting customer needs and interests from food ordering to delivery directly through the table.

BACKGROUND

Restaurant patrons often face several challenges that diminish their dining experience. One challenge is the inherent inadequacy of the food ordering process. For instance, patrons are required to either go to the counter or wait for the staff to take their order. Furthermore, once their orders are placed, patrons do not have a way to inquire about the status of their order or the estimated time until delivery without relying on the restaurant staff. This becomes particularly problematic during peak hours when a restaurant is crowded or understaffed, leading to extended waiting times.

Another challenge is that the hygiene standards of restaurant tables are often inadequate. The quick turnover of customers results in insufficient cleaning between sittings, allowing microbes to spread. This lack of proper hygiene management can compromise the health and safety of both patrons and restaurant staff.

Yet another challenge is that the waiting experience from food ordering to delivery is not designed to be customer-friendly. During this period, patrons are often left with nothing to do, as there are no entertainment options or interactive activities to help them pass the time while waiting for their food to arrive.

Addressing these issues would significantly enhance the overall dining experience, making it more efficient, enjoyable, and hygienic for restaurant patrons.

BRIEF SUMMARY

The present invention relates to a customer-friendly smart dining table for automating and streamlining all food ordering processes in restaurants and meeting customer needs and interests from food ordering to delivery directly on and directly through the table.

The principal objective of the present invention is to overcome the disadvantages of the prior art.

An objective of the present invention is to provide a smart dining table that automates and streamlines the food ordering process in restaurants.

Another objective of the present invention is to provide a smart dining table that improves the experience of the patrons seated in the restaurants.

Another objective of the present invention is to provide a smart dining table that is self-capable of maintaining high hygiene standards.

Yet another objective of the present invention is to empower patrons to meet their needs directly through their smart tables during the food ordering process.

According to an embodiment, the customer-friendly smart dining table comprises a table frame and an interactive interface on the top of the frame. The interface may be capable of simultaneously receiving touch-based inputs, voice-based input, or both from one or more patron(s) and simultaneously providing output(s) to one or more patrons. The interface may have antimicrobial properties to maintain hygiene. The interface may further provide ambient lighting that is adjustable based on the time of the day and current ambiance settings of the surroundings. The interface may further comprise: a feedback module configured for providing automated assistance to the patron(s) in food selection and customization of the menu based on their preference(s); a leisure module that includes a set of interactive applications, operable for elevating the patron experience by offering entertainment and interaction options; a payment module that includes a plurality of payment methods, operable for enabling the patron(s) to complete payments directly from the interface; a power management module configured for managing and optimizing the power inflow and outflow of the interface; and a processing unit configured for processing all the inputs and outputs of/within the interface.

According to an embodiment, the interactive interface further comprises a touch sensitive screen for receiving the touch inputs.

According to an embodiment, the interface further comprises a voice recognition system utilizing advanced techniques to interpret voice inputs including but not limited to Automatic Speech Recognition (ASR), Natural Language Processing (NLP), Text to Speech (TTS), Voice Biometrics, Voice command interfaces, Speech to text (STT) engines and Voice User Interface (VUI).

According to an embodiment, the top of the table frame is treated with one or more antimicrobial agents during manufacturing or post-production to functionalize the antimicrobial properties.

According to an embodiment, the interface further comprises one or more light sensors integrated with the processing unit for functionalizing adjustable ambient lighting.

According to an embodiment, the feedback module is trained through a machine learned neural network method for enabling automated assistance on food selection and customization of menu.

According to an embodiment, the leisure module is connected to at least one camera, at least one microphone and at least one speaker for interacting with the set of interactive applications.

According to an embodiment, the plurality of payment methods in the payment module enable both contact-based and contactless payments.

According to an embodiment, the power management module further comprises externally powered backup power sources, rechargeable backup power sources, or both.

According to an embodiment, the power management module further comprises an energy management unit incorporating one or more sensors and one or more modes of operation for saving power outflow.

According to an embodiment, the interface is integrated with an order management system which is integrated with the operational workflow of restaurant staff for programmed alarming, two-way communication, or both between the patron(s) and the restaurant staff.

According to an embodiment, the order management system is connected to at least one camera, at least one microphone, and at least one speaker on the table for two-way communication.

While the invention has been described and shown with particular reference to the preferred embodiment, it will be apparent that variations might be possible that would fall within the scope of the present invention.

BRIEF DESCRIPTION OF DRAWINGS

The accompanying drawings are included to provide a further understanding of the present disclosure and are incorporated in and constitute a part of this specification. The drawings illustrate exemplary embodiments of the present disclosure and, together with the description, serve to explain the principles of the present disclosure.

DETAILED DESCRIPTION

As used in the description herein and throughout the claims that follow, the meaning of "a," "an," and "the" includes plural reference unless the context clearly dictates otherwise. Also, as used in the description herein, the meaning of "in" may include "in" and "on," and the meaning of "on" may include "on" and "in," unless the context clearly dictates otherwise.

If the specification states a component or feature "may", "can", "could", or "might" be included or have a characteristic, that particular component or feature is not required to be included or have the characteristic.

The terms "includes" and "including" should be interpreted as referring to elements, components, or steps in a non-exclusive manner, indicating that the referenced elements, components, or steps may be present, or utilized, or combined with other elements, components, or steps that are not expressly referenced.

Exemplary embodiments will now be described more fully hereinafter with reference to the accompanying drawings, in which exemplary embodiments are shown. This disclosure may, however, be embodied in many different forms and should not be construed as limited to the embodiments set forth herein. These embodiments are provided so that this disclosure will be thorough and complete and will fully convey the scope of the disclosure to those of ordinary skill in the art. Moreover, all statements herein reciting embodiments of the disclosure, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

The present invention comprises systems and methods related to a smart dining table for automating and streamlining all food ordering processes in restaurants and meeting customer needs and interests from food ordering to delivery to payment directly on the table through a smart table interface.

Figure 1:
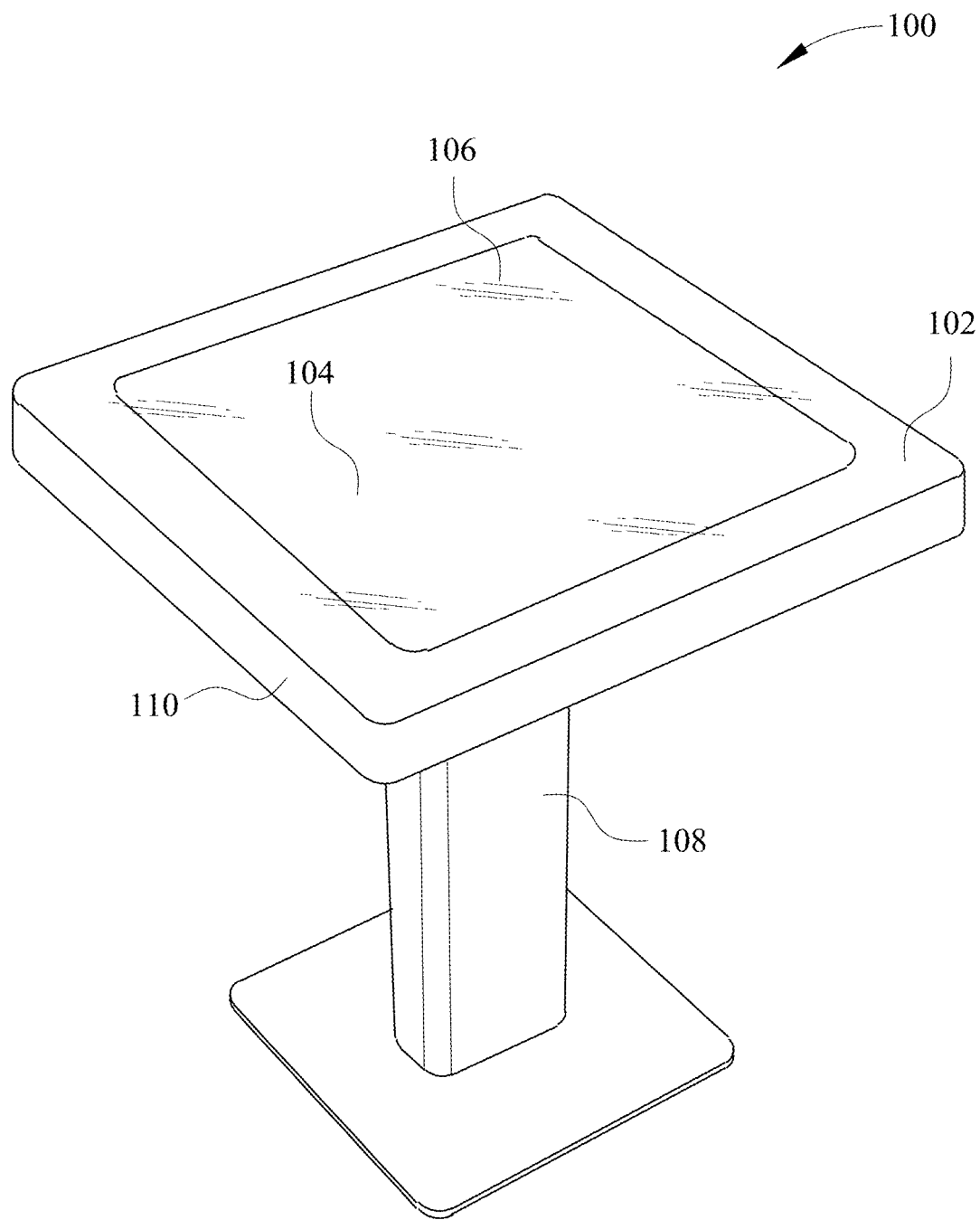
FIG. 1 illustrates an example isometric view of a smart dining table, in accordance with the present disclosure.

FIG. 1 illustrates an isometric view of an exemplary smart dining table in accordance with the present disclosure. The smart dining table 100 may comprise a robust table frame 108 as its base structure, providing stable support from the ground level. According to some embodiments, table frame 108 may be designed to provide connections and/or housing for power supply components or other hardware components of the table 100 (see, e.g., FIGS. 4A-4C). The design, dimensional configurations, and materials used for making the table frame 108 may vary depending on a plurality of factors such as preferences of a particular restaurant, height of the chair(s), design choices, availability of material, skill and style of manpower, etc.

The smart dining table 100 may further comprise an interactive interface 102 on top of the table frame 108. As discussed herein, the interface 102 may be configured to provide various functionalities for automating and streamlining the customer experience from food ordering to delivery directly through the table. The interface 102 may comprise a casing (see, e.g., FIGS. 4B and 5B) to house internal circuitry and other hardware components of the table 100. Additionally or alternatively, the table frame 108 may be designed to provide an expanded mounting surface and/or housing for one or more components of interface 102. The interface 102 may be affixed to the table frame 108 or it may be detachable, as per user requirements. For instance, the interface 102 may comprise a mounting means (see e.g., FIG. 5B) which enables the user to attach and detach the interface 102 to/from the table frame 108. This may be advantageous, for example, in embodiments where the interface 102 comprises a rechargeable power supply (see, e.g., FIG. 5C).

The interface 102 may comprise one or more touch-sensitive screens 104 for interacting with one or more users. The touch-sensitive screen 104 may be configured to simultaneously receive independent inputs from a plurality of users. For example, if four persons are seated around the table 100, each person may independently provide touch-based inputs to the interface 102 simultaneously by interacting with one or more portions of the touch-sensitive screen 104. Touchscreen technologies used for receiving touch-based inputs via the touch-sensitive screen 104 may include, for example, capacitive touch screen, resistive touch screen, infrared touch screen, surface acoustic wave (SAW) touch screen, optical imaging display, or the like.

According to an embodiment, touch-sensitive screens 104 may comprise one or more of a Light Emitting Diode (LED) Display, a Liquid Crystal Display (LCD), an Organic Light Emitting display (OLED), an Active Matrix Organic Light Emitting Diode (AMOLED) Display, a Micro Light Emitting Diode (MicroLED) Display, a Quantum Dot Display, a Miniature Light Emitting Diode (Mini-LED) display, a Laser Phosphor Display (LPD), an Electronic Ink (E-Link) Display, a Holographic Display, a Plasma Display, or the like.

The smart dining table 100 may further comprise an antimicrobial surface 106 on top of the interactive interface 102. The antimicrobial surface 106 may have properties that enhance hygiene by ensuring the surface of the table remains clean and safe for human contact. For example, the antimicrobial surface 106 may be configured with properties that help prevent biofilm formation, reduce the microbial load of bacteria, viruses, and fungi, or the like.

According to some embodiments, the antimicrobial surface 106 is a glass surface which has been treated with one or more antimicrobial agents. For instance, a glass surface may be treated with one or more antimicrobial agents during the manufacturing stage or during the post-production stage. During the manufacturing stage, antimicrobial agents may be integrated into the glass itself by applying a liquid form of the antimicrobial agent to the glass surface and curing using heat or UV light to form a durable coating. During the post-production stage, existing glass surfaces may be treated with antimicrobial coatings through spraying or dipping processes, or adhesion may be used to ensure the antimicrobial layer adheres strongly to the glass, maintaining effectiveness over time. According to some embodiments, the antimicrobial agents used for maintaining hygiene on the table may include one or more of silver ions, copper ions, or other metal ions known for their antimicrobial properties.

The antimicrobial surface 106 may be affixed to or otherwise operably coupled with the interactive interface 102 to optimize interaction with the patron(s). According to some embodiments, the antimicrobial surface 106 may be connected to or coextensive with one or more touch-sensitive screens 104 of the interface 102 in order to enable hygienic touch-based interaction with restaurant patrons. Additionally or alternatively, the antimicrobial surface 106 may be affixed directly onto the table frame 108.

The table 100 may optionally comprise one or more trim elements 110 on the perimeter of interface 102. Trim elements 110 may be affixed to interface 102 and/or table frame 108, or they may be detachable as per user requirements. Trim elements 110 may be applied for aesthetic purposes, for instance, to cover or enclose components of the interface 102. Additionally or alternatively, one or more trim elements 110 may be configured to enable user interaction with the interface 102. For example, one or more trim elements 110 may be designed to support placement of one or more input/output devices in accordance with the present disclosure. The design, dimensional configurations, and materials used for making trim elements 110 may vary depending on a plurality of factors such as preferences of a particular restaurant, design of the interface 102 and/or the table frame 108, availability of material, skill and style of manpower, etc.

According to some embodiments, the interactive interface 102 or the table frame 108 may be designed to comprise one or more trim elements 110.

According to some embodiments, the interface may comprise multiple touch-sensitive screens for receiving touch-based inputs and displaying outputs. For example, referring to FIG. 2, a smart dining table 200 in accordance with the present disclosure may comprise an interactive interface 202 comprising two distinct touch-sensitive screens 204A and 204B. Each of the touch-sensitive screens 204A and 204B may be configured to independently receive inputs from and display outputs to one or more users. For example, each of the touch-sensitive screens 204A and 204B may be configured to interact with one or more patrons on a particular side of the table 200.

The smart dining table 200 may further comprise an antimicrobial surface 206 coupled at least with touch-sensitive screens 204A and 204B in order to provide hygienic interaction with the interface 202. The smart dining table 200 may further comprise a table frame 208 as its base structure, providing structural support for the interface 202.

Figure 2:
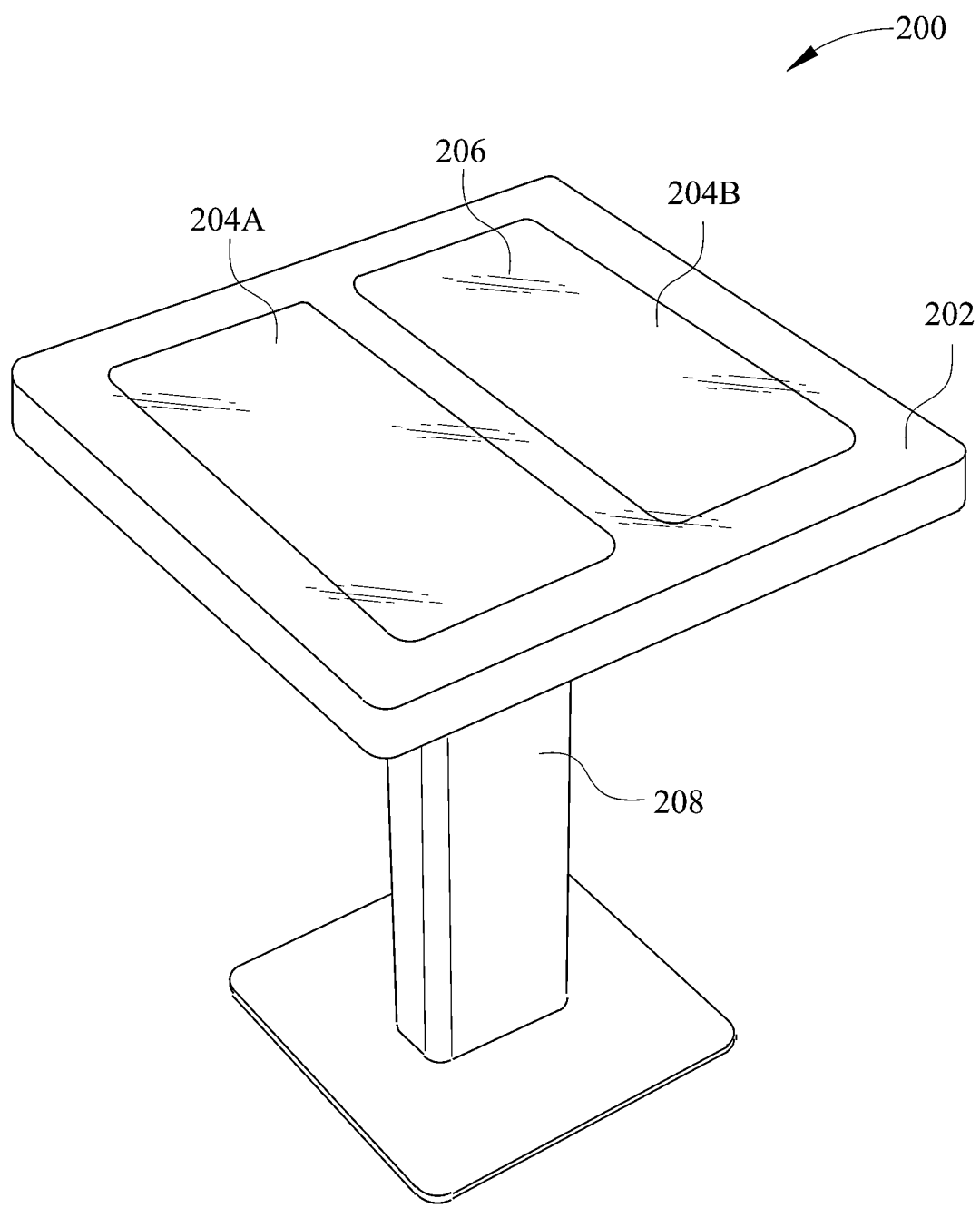
FIG. 2 illustrates an example isometric view of a smart dining table having multiple displays, in accordance with the present disclosure.
Figure 3:
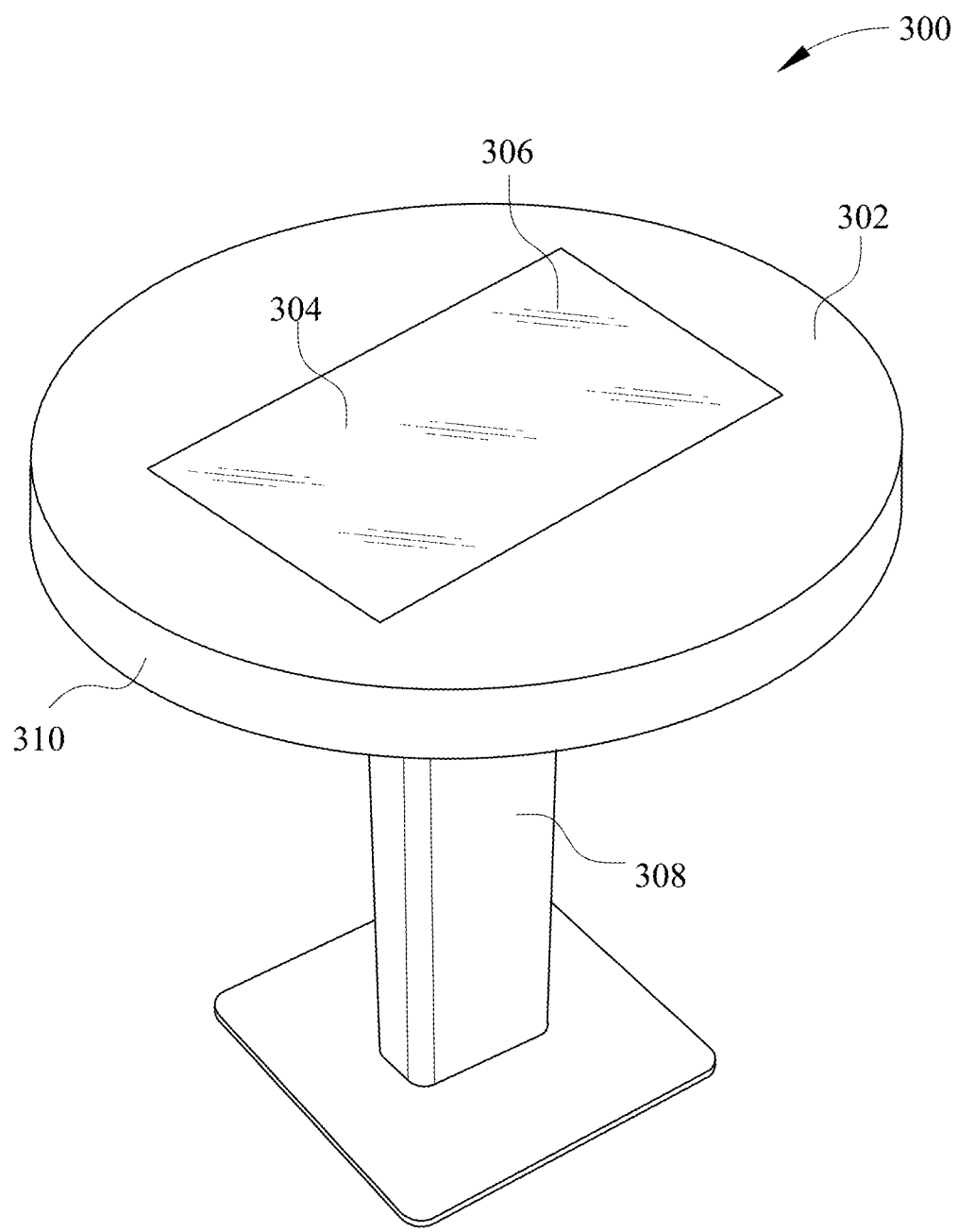
FIG. 3 illustrates an example isometric view of a smart dining table having a circular shape, in accordance with the present disclosure.

FIG. 3 illustrates certain variations in the configuration of the smart dining table in accordance with the present disclosure. For instance, while FIGS. 1 and 2 depict examples of a smart dining table having a square-shaped top, FIG. 3 illustrates an example of a smart dining table having circular top. Similarly, the top of the table may be rectangular, triangular, rhomboid, oval, hexagonal, pentagonal, octagonal, decagonal, freeform, trapezoidal, round-cornered, convertible shape, or the like.

The interface 302 may be designed to fit a table 300 of any shape. In some cases, the table frame 308 may be expanded to encompass a portion of the top of the table 300, and the interface 302 may be designed to fit into the table frame 308 accordingly. The antimicrobial surface 306 may similarly be designed to cover the breadth of the interface 302 and/or the breadth of the table frame 308. Alternatively, the antimicrobial surface 306 may be designed to cover one or more portions of interface 302, such as the portions of the interface 302 comprising the touch-sensitive screen 306 and/or other input/output devices of the table 300.

The optional trim elements 310 may also be designed to fit the shape of the interface 302 and/or the table frame 308. According to some embodiments, the interactive interface 302 or the table frame 308 may be designed to comprise the one or more trim elements 310.

Figure 4A:
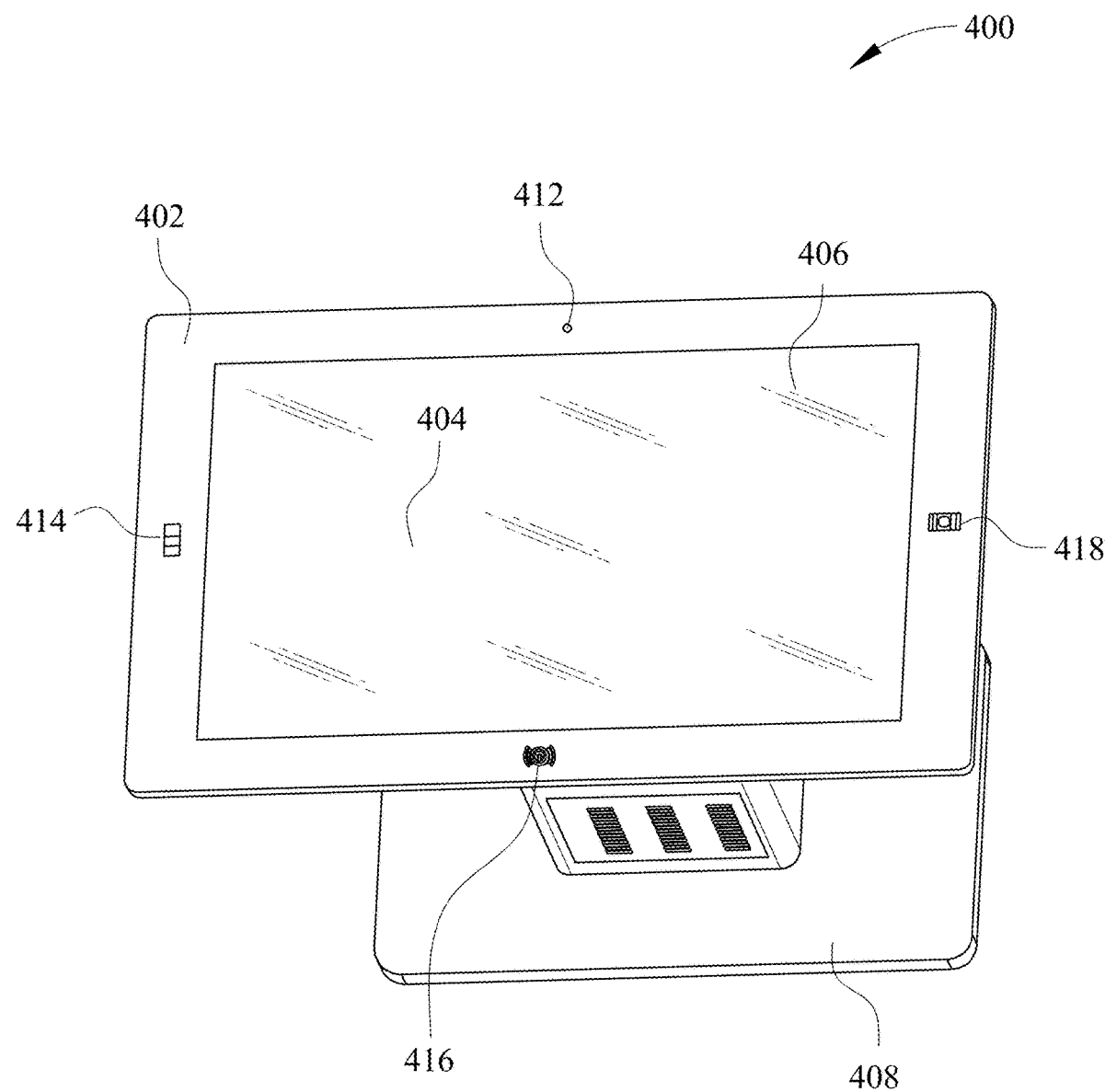
FIGS. 4A-4C illustrate an example of a smart dining table, in accordance with the present disclosure.
Figure 4B:
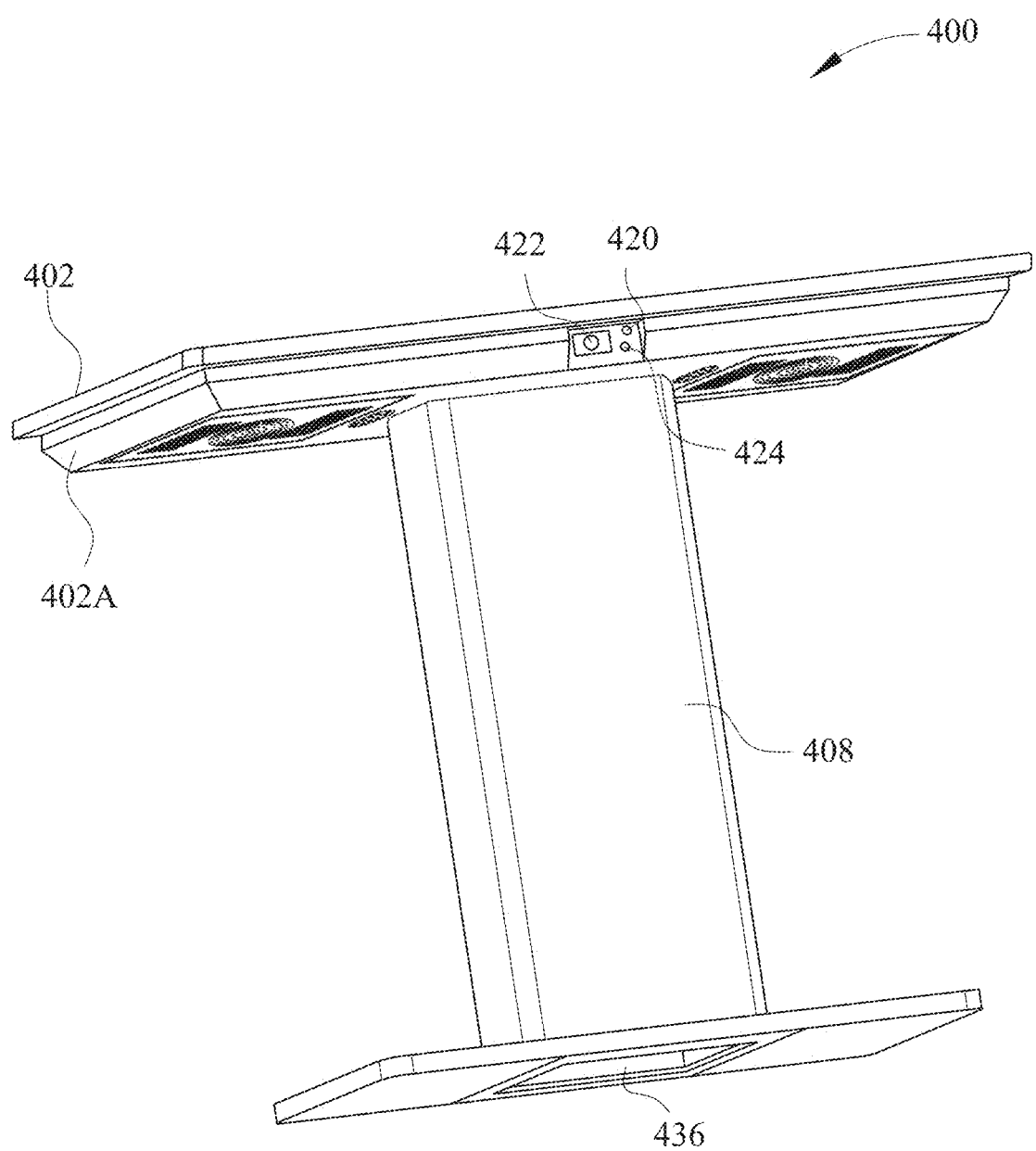
Figure 4C:
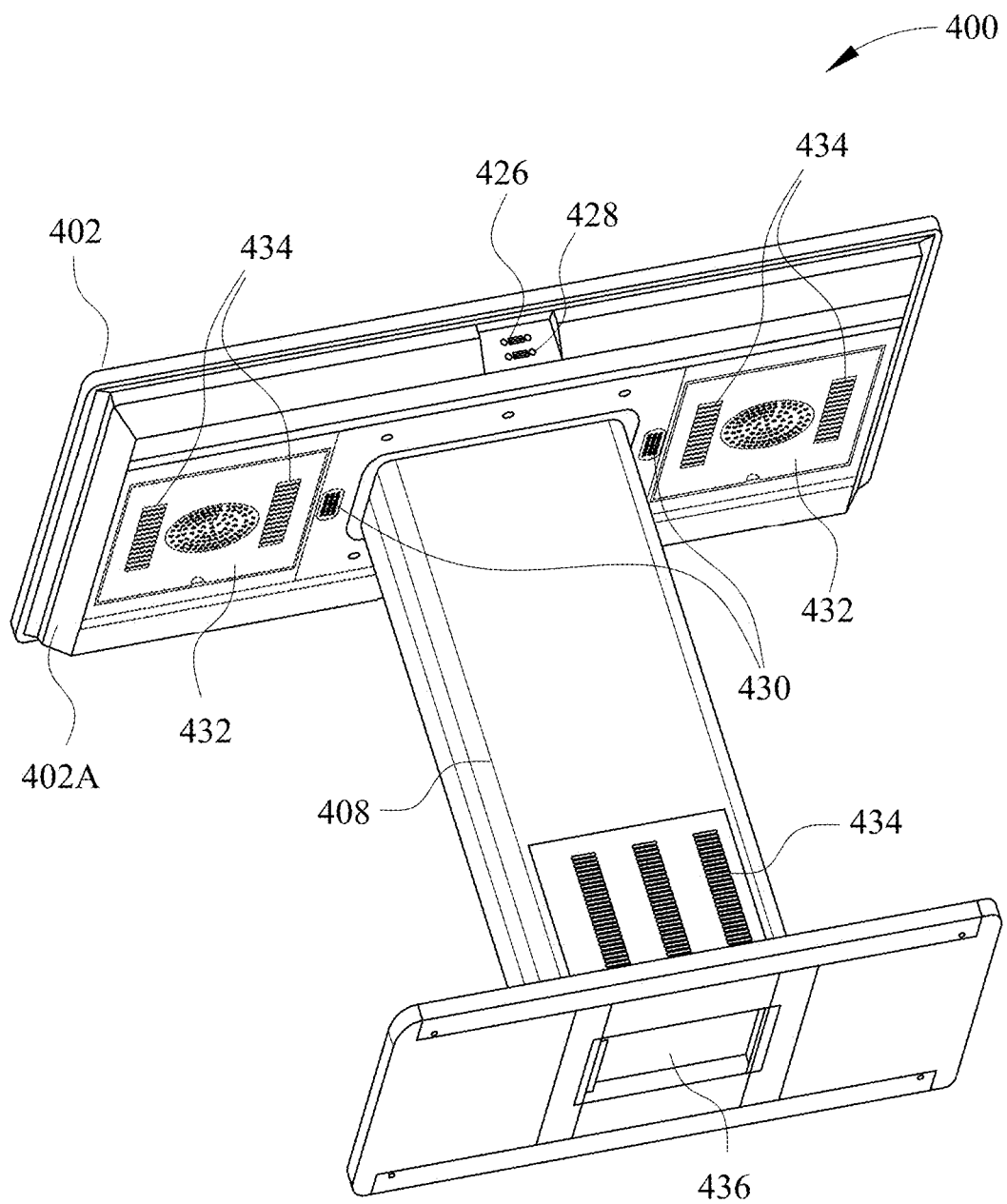

FIGS. 4A-4C further illustrate components of a smart dining table in accordance with the present disclosure. The smart dining table 400 may comprise an interactive interface 402 on top of a table frame 408. The interactive interface 402 may be affixed to table frame 408 in a substantially permanent manner, or it may be detachable as per user requirements. The table 400 may comprise one or more touch-sensitive screens 404 and an antimicrobial surface 406.

The table 400 may further comprise one or more cameras 412 for enabling image- and/or video-based communication between the interface 402 and one or more users. For instance, one or more cameras 412 may be positioned on the table such that one or more patrons at the table may independently communicate with interface 402. Cameras 402 may be affixed to the interface 402, as shown, or may be affixed elsewhere on the table 400. One or more cameras 412 may also be detachable as per user requirements.

The smart table 400 may further comprise one or more payment devices 414 to enable users to complete payments directly at the table 400. Payment devices 414 may comprise one or more contact-based payment devices, contactless payment devices, or combined contact-based and contactless payment devices. Payment devices 414 may be affixed to the top of the interface 402, as shown, or may be affixed elsewhere on the table 400 such that they are accessible to users at the table. For instance, one or more payment devices 414 may be affixed on the perimeter of interface 402 or on the table frame 408. In some embodiments, one or more payment devices 414 may be detachable as per user requirements.

Each payment device 414 may be configured to receive one or more forms of payment from users. For example, a payment device 414 may be configured to receive one or more forms of contact-based payment such as cash deposits, credit/debit card payments, pin-based transactions, magnetic stripe card payments, or the like. Additionally or alternatively, a payment device 414 may be configured to receive one or more forms of contact-less payment including: contactless debit/credit cards, such as cards equipped with Near Field Communication (NFC) technology; payments through mobile wallets, such as Amazon Pay, Google Pay, and Samsung Pay; QR code based payments like Alipay and WeChat Pay; NFC-enabled tap-to-pay transactions; Radio Frequency Identification (RFID) payments; Bluetooth payments including Beacons, Poynt, or the like; Biometric payments including Amazon One; and other online payment gateways including Paypal, Stripe, Square, or the like.

The smart dining table 400 may further comprise one or more sensors 416 for detecting conditions in the surrounding environment. According to some embodiments, sensors 416 may be light sensors configured to detect the intensity and/or color of the surrounding light. The sensors 416 may be located on table frame 408 near the interface 402, or they may be integrated into the interface 402.

The smart dining table 400 may further comprise one or more wireless charging ports 418 for charging electronic devices such as cell phones or tablets.

Referring to FIG. 4B, the smart dining table 400 may further comprise a casing 402A which houses the internal circuitry of the interface 402. The casing 402A may further be designed to support placement of one or more components of the table 400, as discussed herein.

The table 400 may further comprise one or more microphones 420 for capturing audio inputs from one or more users. For example, one or more microphones 420 may be positioned on the table 400 to receive voice-based inputs from patrons seated around the table.

Smart dining table 400 may further comprise one or more interface status indicators 422 configured to continuously measure and display the voltage, the charge and discharge current, the energy consumed, the remaining battery capacity, or the like.

Smart dining table 400 may further comprise one or more power switches 424 that operate one or more power modes of the interface. For example, a power switch 424 may activate one or more functions such as ON/OFF, sleep mode, low-energy mode, or the like.

Referring to FIG. 4C, smart dining table 400 may further comprise one or more wired charging ports 426 for charging electronic devices. Wired charging ports 416 may comprise, for example, Universal Serial Bus (USB) ports.

Smart dining table 400 may further comprise one or more wired internet connection ports 428 to provide hardwired internet access for electronic devices. Additionally or alternatively, smart dining table 400 may comprise one or more wireless internet connection ports (not shown) to provide wireless internet access to patrons.

Smart dining table 400 may further comprise one or more speakers 430 for providing audio output. For example, one or more speakers may be positioned on the table to deliver audio output from interface to one or more persons at the table. Speakers 430 may be affixed to the table frame 408 or they may be integrated into the interface 402.

Smart dining table 400 may further comprise one or more doors 432 for enabling access to the components within the table 400. For example, one or more doors 432 may allow access to the internal circuitry and/or hardware components of the interface 402 and/or the table frame 408.

The table 400 may further comprise one or more vents 434 for cross ventilation and outflow of heat generated by the electronic components fitted inside the table 400.

The table frame 408 may be fitted with one or more conduits 436 for enabling connection between one or more components and/or housing of one or more components of the table 400. For example, a conduit 436 may be utilized to channel one or more power cords for supplying power to the interface 402. Additionally or alternatively, a conduit 436 may be utilized to house a backup power supply connected to the interface 402.

Figure 5A:
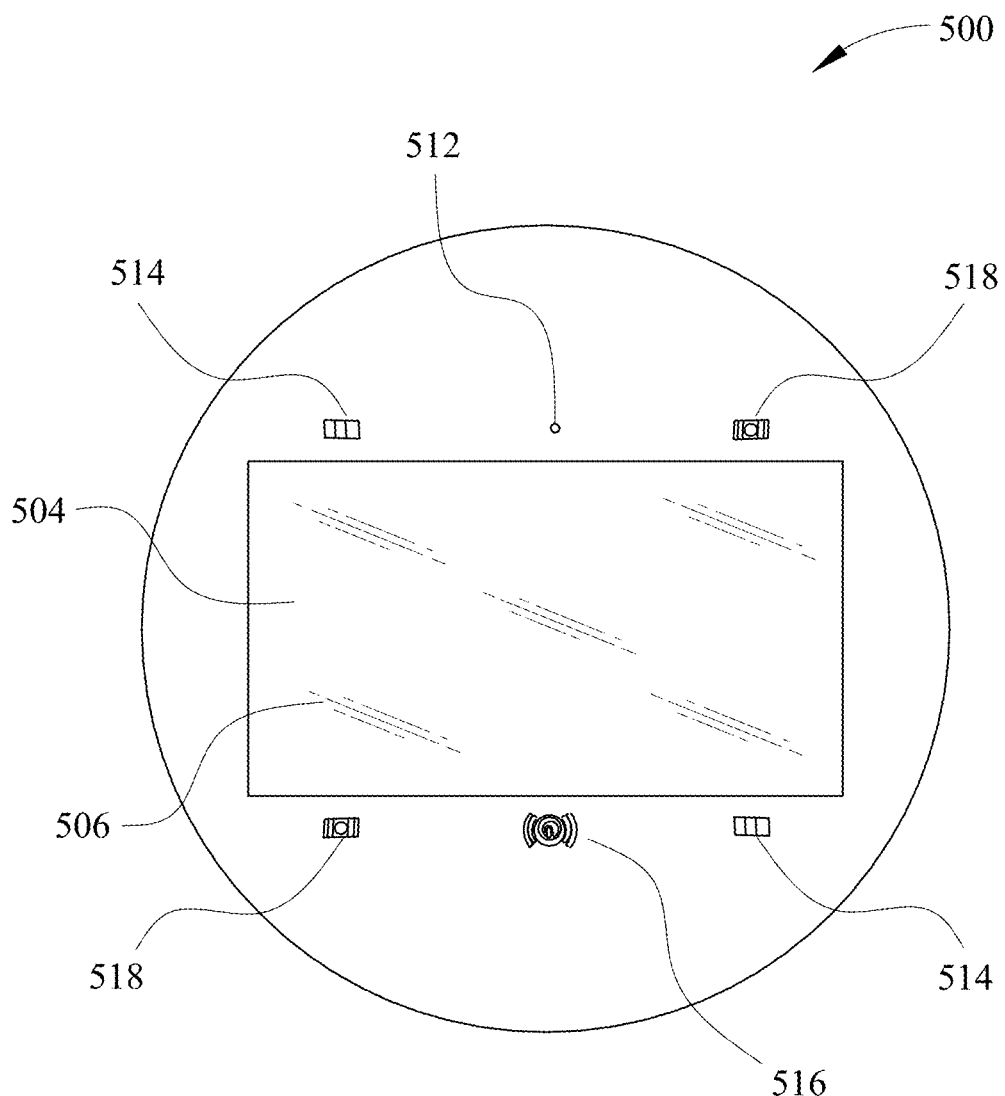
FIGS. 5A-5C illustrate an example of a detachable smart dining table interface, in accordance with the present disclosure.
Figure 5B:
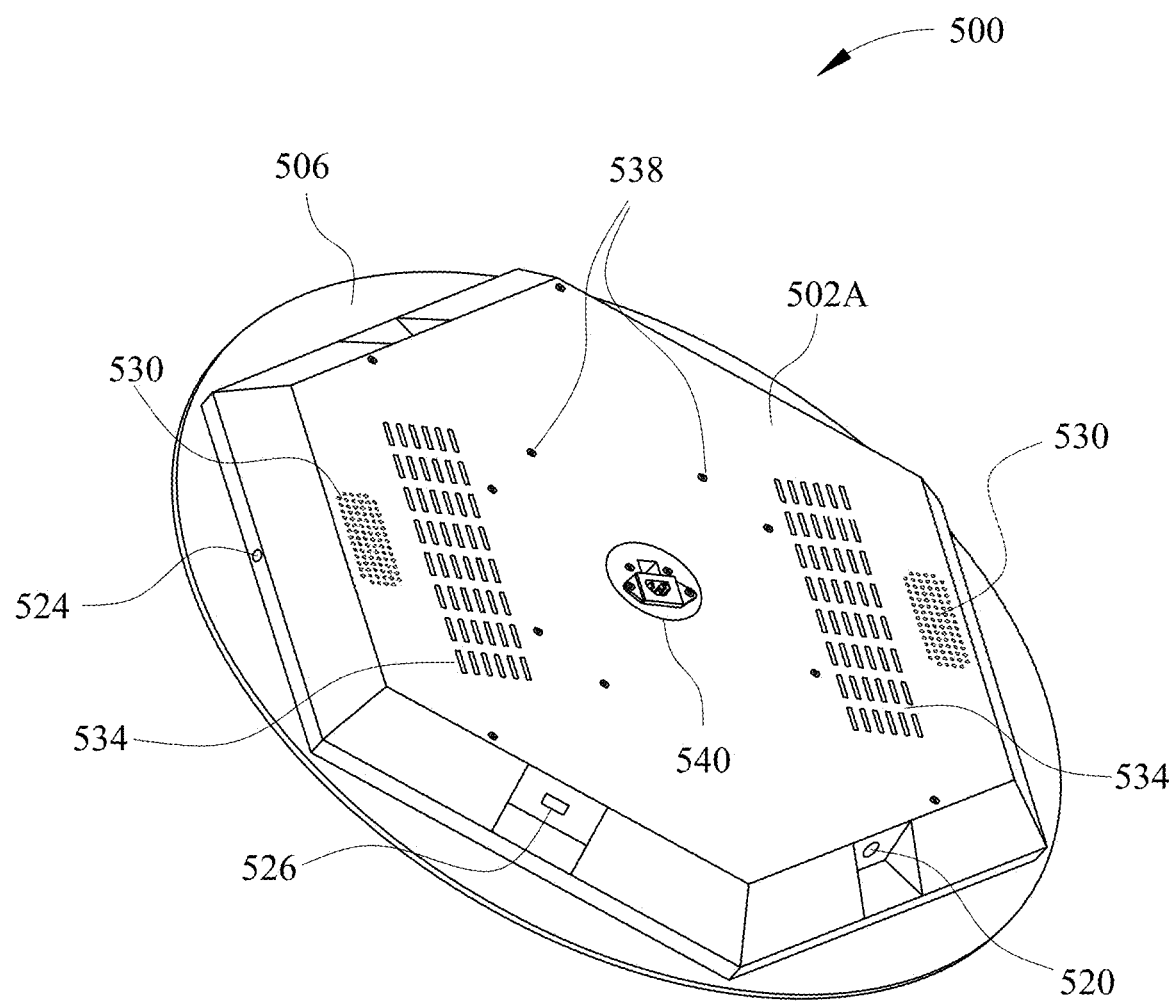
Figure 5C:
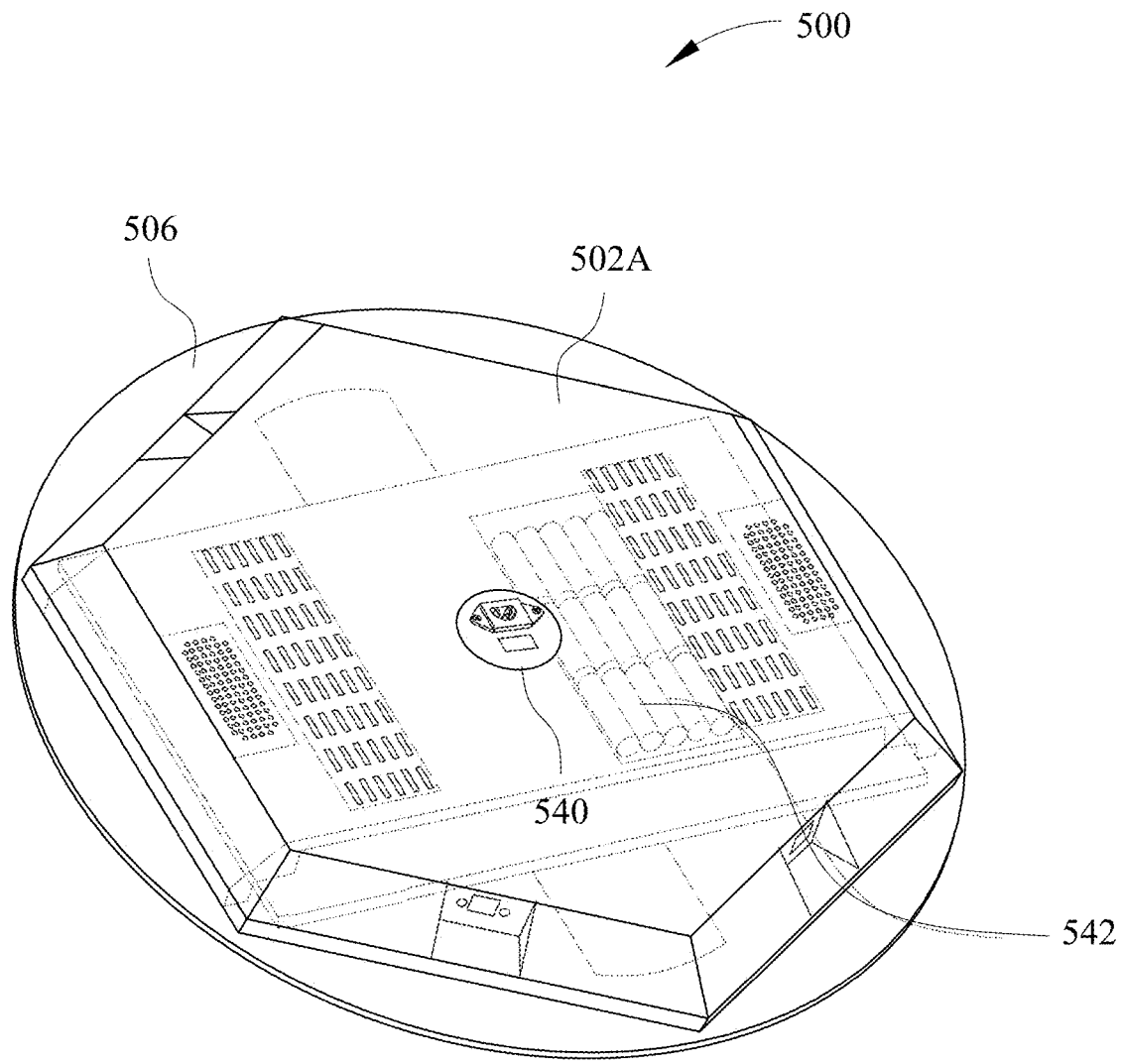

FIGS. 5A-5C illustrate components of a detachable smart dining table interface, in accordance with the present disclosure. Referring to FIG. 5A, a detachable interactive interface 500 may comprise one or more components similar to those discussed with reference to FIGS. 4A-4C, such as one or more touch-sensitive screens 504, an antimicrobial surface 506, one or more cameras 512, one or more payment devices 514, one or more sensors 516, and one or more wireless charging ports 518.

Referring to FIG. 5B, detachable interactive interface 500 may further comprise casing 502A, one or more microphones 520, one or more power switches 524, one or more wired charging ports 526, one or more speakers 530, and one or more vents 534.

The detachable interactive interface 500 may further comprise mounting means 538 for securely attaching the interface 500 to a table frame (not shown). For example, a mounting means 538 may be coupled with corresponding hardware on a table frame in order to securely fasten the interface to the table frame.

The detachable interactive interface 500 may further comprise one or more power supply ports 540. The power supply port 540 may enable a wired power supply connection to the interface 500. Additionally or alternatively, the power supply port 540 may enable recharging of an embedded battery pack of the interface 500.

Referring to FIG. 5C, the detachable interactive interface 500 may further comprise an embedded power supply 542. The embedded power supply 542 may be, for example, a rechargeable battery pack which may be charged by connecting the interface 500 to a power source via power supply port 540.

In accordance with the present disclosure, the interactive interface of the smart dining table may be configured to concurrently communicate with a plurality of patrons. The interface may be configured to receive touch-based, voice-based inputs, or both from one or more patrons simultaneously and processing the inputs concurrently to provide simultaneous results to the one or more patrons. For example, if four patrons are seated around a table, each person may independently provide touch-based inputs to the interface and may receive respective outputs simultaneously. The interface may be configured to accept input and/or provide output on a small part of the display screen or on the entire display screen, as per user requirements.

According to an embodiment, the interface may be configured to present one or more sections or windows for simultaneously interacting with multiple patrons at the table. For example, referring to FIG. 1, touch-sensitive display 104 may be divided into four sections, each section for interacting with a patron seated at a corresponding side of the table 100. Each section of a touch-sensitive screen may be configured to independently receive touch-based inputs from a respective patron seated at the table. The interface may be configured to concurrently process simultaneous inputs on the multiple sections of the touch-sensitive screen and to independently display respective outputs to each patron via the respective sections.

The smart dining table interface may further be configured to concurrently receive and process one or more voice-based inputs from one or more patrons at the table. For example, referring to FIG. 1, a microphone may be near each of the four sides of the table 100 in order to independently capture simultaneous voice-based inputs from a respective patron seated around the table 100. The interface may be configured to concurrently process simultaneous voice-based inputs, along with any touch-based inputs, and to independently provide respective outputs to each patron. For example, the interface may simultaneously deliver audio output and/or display output in response to input from one or more patrons.

According to an embodiment, the technology used for enabling voice-based communications on the interface 102 may be Automatic Speech Recognition (ASR), Natural Language Processing (NLP), Text to Speech (TTS), Speech to text (STT), Voice Biometrics, Voice Command Interfaces, and Voice User Interface (VUI).

The smart dining table may be configured with a number of functionalities and features for automating and streamlining the restaurant dining experience. As previously discussed, the interface may receive touch-based inputs, voice-based inputs, or both from one or more patrons at the table, and provide outputs to the patrons in one or both of audio and visual formats. The interface may process inputs from patrons in order to provide automated, real-time assistance in the food selection and ordering process. The interface may further facilitate placing a food order and provide notifications regarding the status of a food order. The interface may further offer a variety of entertainment options to improve patrons' experience while seated at the table. The interface may further enable patrons to complete payments while seated at the table.

Figure 6:
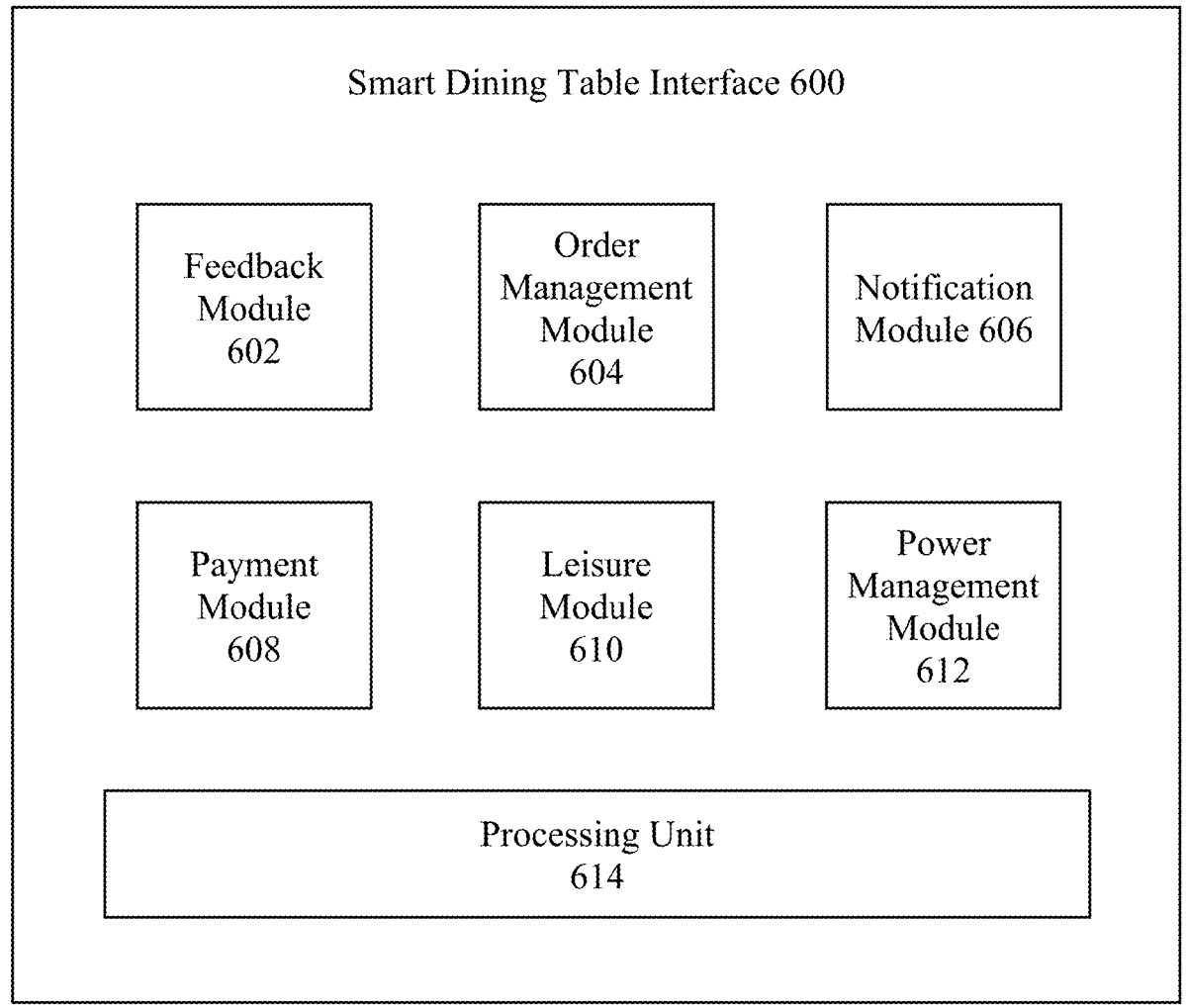
FIG. 6 illustrates a block diagram of exemplary modules of a smart dining table interface, in accordance with the present disclosure.

FIG. 6 illustrates an exemplary configuration of components of an interactive smart dining table interface in accordance with the present disclosure. The interactive interface 600 may comprise a feedback module 602 configured to provide automated assistance to users in food selection and customization of menu. As a basic example, a patron seated at the table may say "I would like to order a pizza." The interface 600 may receive the spoken input through one or more microphones on the table, and may use its voice recognition system to convert the patron's spoken input into text. The feedback module 602 may parse the text generated by the voice recognition system to identify the term "pizza" as a keyword, and check the available menu for matching items. According to an embodiment, the feedback module 602 may apply a series of if-else conditions to parse the input and match it with available products and menu items. Additionally or alternatively, the feedback module 602 may employ natural language processing techniques to parse the input and match it with available products and menu items.

The feedback module 602 may provide one or more outputs corresponding to the matching menu items in response to input by one or more patrons. Continuing the above example, feedback module 602 may output a list of menu items corresponding to the term "pizza" for display to the patron. Additionally or alternatively, the feedback module may provide audio output corresponding to the matching menu items. According to an embodiment, the feedback module 602 may pass a text-based list of matching items to a Text-to-Speech converter of the voice recognition system to generate a spoken response to the patron. For example, the interface may provide a voice output listing the available types of pizza and prompting the patron for a selection. The voice output may be provided concurrently with a corresponding display on one or more touch-sensitive screens.

The feedback module 602 may further guide the user through available customization and/or add-on options. For example, in response to the patron selecting a type of pizza, the feedback module 602 may match the selection with available customization options. For example, the feedback module may identify and output a list of additional toppings for selection by the patron. Once the patron completes the order, the feedback module may output a confirmation of the order to the patron and may optionally direct the patron to other available menu items. For example, the interface may display the ordered item on the screen and speak a response such as, "You have ordered a pizza. Would you like to add anything else?"

The feedback module 602 may be trained by standard Artificial Intelligence-based machine learned neural network methods for enabling automated assistance on food selection and customization of menu. Additionally or alternatively, the feedback module 602 may be trained using deep neural networks based on large language models that are trained using a large amount of internet data and fine-tuned as per restaurant requirements. Additionally or alternatively, the feedback module 602 may be configured to employ active learning techniques to improve menu suggestions based on inputs and outputs processed by the interface.

In some embodiments, the feedback module 602 may be connected to a database of menu items, ensuring that the conditional logic is always up to date with the latest offerings. The database may be stored locally on one or more memory units of the interface 600, or it may be accessed remotely by interface 600 through a network.

The interface 600 may further an order management module 604 configured to place and monitor food orders. The order management module 604 may be integrated with the operational workflow of restaurant staff, which helps in order processing, programmed alarming, and two-way communication between patron(s) and the restaurant staff. As previously discussed, the interface may receive touch-based inputs, voice-based inputs, or both indicating a desire by one or more patrons to order one or more menu items. The order management module 604 may process the received input(s) in order to place the order with the restaurant staff. For example, the order management module 604 may be configured to be in network communication with a restaurant's ordering system in order to communicate food orders and updates.

According to some embodiments, the order management module 604 may comprise an internal clock which is linked to the restaurant's ordering system. Once an order is placed by a patron, the clock may be monitored concurrently with signals from the restaurant's ordering system in order to provide status updates to one or more patrons at the table. For example, the interface 600 may output an alarm to inform the patron that the food is ready or that the food is halfway prepared. Likewise, the two-way communication may enable patrons to enquire about the delay in delivery of food, the status of food, or anything else related to the restaurant, restaurant staff, or food order.

According to an embodiment, the order management module 604 is connected to at least one camera, at least one microphone, and at least one speaker on the table to enable two-way communication between patron(s) and the restaurant staff as and when required.

According to some embodiments, the interface 600 may further comprise a notification module 606 for providing real-time updates on the order status and estimated time of arrival of the food items. In some embodiments, the real-time updates on the order status and the estimated time of arrival of the food items may be provided via a display on the table. In other embodiments, the real-time updates on the order status and the estimated time of arrival of the food items may be provided via one or more speakers on the table. In some embodiments, both audio and visual outputs may be provided by the notification module 606.

According to an embodiment, the notification module outputs notifications based on signals received from the order management module 604. For example, the status of a food order may be updated by the order management module 604 based on real-time inputs from the restaurant's staff using an integrated restaurant ordering system such as a Point of Sale (POS) device or an Admin Application. Each time the staff updates the order status (e.g., order received, preparing, ready for pickup) via a restaurant ordering system, the order management module 604 may responsively update the status of the order at the interface 600. The notification module 606 may monitor updates by the order management module 604 and responsively output the updates to the patron(s). Further, the delivery time of the food may be calculated based on the average preparation time of the ordered dishes and the current kitchen load. This information may be dynamically updated and displayed by the notification module 606.

According to an embodiment, the smart table interface 600 may further a payment module 608 that includes a plurality of payment methods, operable for enabling the patron(s) to complete payments directly from the table. The payment module 608 may communicate with one or more payment processing services over a network. The plurality of payment methods in the payment module 608 enables both contact-based payments and contact-less payments. For example, payment module 608 may be configured to process one or more contact-based payment methods such as cash deposits, credit/debit card payments, pin-based transactions, magnetic stripe card payments, or the like. Additionally or alternatively, payment module 608 may be configured to process one or more contact-less payment methods such as contactless debit/credit cards like cards equipped with Near Field Communication (NFC) technology; payments through mobile wallets like Amazon Pay, Google Pay, and Samsung Pay; QR code based payments like Alipay and WeChat Pay; NFC enabled tap to pay transactions; Radio Frequency Identification (RFID) payment; Bluetooth payments like Beacons and Poynt; Biometric payments like Amazon One; other online payment gateways like Paypal, Stripe, and Square. According to an embodiment, payment module 608 may be configured to communicate with one or more payment devices affixed to the table in order to receive payment from a patron.

According to an embodiment, the interface 600 may further comprise a leisure module 610 that includes a set of interactive applications operable by the patron(s) for elevating their experience by offering entertainment and interaction options. The leisure module 610 may comprise one or more educational apps such as Amazon Kindle, dictionary, and learning games; entertainment apps which offer music, movies, live/recorded shows, and/or serials; social media apps; informative apps like tracking apps, weather information display apps, calendar, calculator; or the like.

According to an embodiment, the leisure module 610 is connected to one or more cameras, microphones, and/or speakers on the table in order to enable the patron(s) to interact with the set of interactive applications in any suitable manner.

The smart table interface 600 may further comprise a power management module 612 configured for managing and optimizing the power inflow and outflow of the interface. The power management module 612 may be configured to be in communication with external power sources, rechargeable power sources, or both. Power management module 612 may monitor the state of one or more power sources of the smart table interface in order to optimize power management in real-time.

According to some embodiments, the power management module 612 may facilitate external charging through electric ports. In some embodiments, the power management module 612 may comprise battery-based backup power sources which may be recharged as per requirement. In some embodiments, both externally powered and rechargeable backup power sources may be deployed.

According to some embodiments, the power management module 612 may further comprise an energy management unit incorporating one or more detection devices and one or more modes of operation for saving power outflow. For example, a detection device may include one or more of sensors on the table and modes of operation may include one or more of a sleep mode and a full-power mode, wherein the sleep mode may be activated during non-operational hours responsive to a detection of a lower level of light intensity, and wherein the interface may quickly resume to full-power operation responsive to a detection of a higher level of light intensity.

According to an embodiment, the smart dining table interface 600 may further comprise a processing unit 614 configured to control and manage the overall operation of the interface. The processing unit 614 may be responsible for processing all inputs and outputs of the interface 600 including touch-based inputs, voice-based inputs, camera inputs, sensor inputs, and the like. The processing unit 614 may further be configured to execute one or more modules of the interface 600 and/or manage data communication between the one or more modules of interface 600.

According to an embodiment, the interface 600 may provide ambient lighting that may be adjustable based on the time of the day and/or the current ambiance settings of the surroundings. The feature of ambient lighting in the interface serves in power management and conservation of the interface's power, reduces eye strain by maintaining an appropriate brightness level for different lighting conditions, and ensures that the interface is always readable regardless of the surrounding lighting conditions, thus improving the overall user experience.

According to an embodiment, one or more light sensors on the table may be integrated with the power management module 612 and the processing unit 614 for functionalizing adjustable ambient lighting. The processing unit 614 may apply adaptive lighting algorithms to analyze data from the ambient light sensors to dynamically adjust the interface display. For example, the processing unit 614 may monitor and adjust the screen brightness and/or color temperature of the interface display responsive to detected ambient conditions, wherein the programmed goal may be to provide optimal visibility and/or to reduce eye strain based on the current lighting conditions.

In some embodiments, the interface's backlighting, typically provided by LED displays, may be automatically adjusted in real-time. This can involve changing the brightness levels and sometimes the color temperature of the LED display to match the ambient light.

According to an embodiment, when an ambient light sensor detects low light conditions, the screen brightness may be reduced to prevent glare and eye strain. Conversely, in bright conditions, the brightness may be increased to improve visibility.

In some embodiments, the color temperature of the interface may also be adjusted based on the color temperature of the ambient environment. In an instance, in cooler, bluish light environments, the interface may adopt a cooler color temperature. In warmer, yellowish light environments, the interface may shift to a warmer color temperature.

A person having skill in the art should appreciate the fact that the placement of all the aforementioned different embodiments on and within the interactive interface may vary in each smart dining table based on end-user requirements. For example, the microphone, the camera, the speakers, the payment methods, the charging ports, the internet connection ports, the interface status displays, and the ON/OFF switches, may be anywhere on the circumference, or anywhere on the top side, or anywhere on the bottom side of the table frame. Likewise, one or more modules for executing functionalities of the smart dining table interface may be located anywhere within the interface.

The detailed description of the invention and the accompanying examples provided herein are intended to illustrate the principles of the invention and its practical applications. These embodiments are provided by way of example only and are not intended to limit the scope of the invention. It should be understood that various modifications, adaptations, and alternatives may be made without departing from the spirit and scope of the invention.

The invention may be practiced in a variety of forms and configurations beyond those explicitly disclosed, including but not limited to different combinations of hardware and software components, different computing environments, and different system architectures. The specific embodiments disclosed herein are illustrative and are not intended to limit the scope of the invention as set forth in the following claims.

For instance, one or more components of the disclosed system may be implemented in various computing environments. According to some embodiments, the smart table interface may include a processor and a memory. The processor may be any type of general or specific-purpose processor, such as a central processing unit (CPU), a graphics processing unit (GPU), a digital signal processor (DSP), or any other type of processing unit. The processor executes instructions stored in the memory to perform the functions described herein.

The memory may include any type of computer-readable storage medium, such as random access memory (RAM), read-only memory (ROM), flash memory, a hard disk drive (HDD), a solid-state drive (SSD), or any other type of storage device. The memory stores program instructions and data used by the processor to perform the functions described herein.

It should be apparent to those skilled in the art that many more modifications besides those already described are possible without departing from the inventive concepts herein. Numerous modifications, changes, variations, substitutions, and equivalents will be apparent to those skilled in the art, without departing from the scope of the disclosure, as described in the claims. The foregoing description of the specific embodiments will so fully reveal the general nature of the embodiments herein that others can, by applying current knowledge, readily modify, adapt for various applications such specific embodiments without departing from the generic concept, and, therefore, such adaptations and modifications should and are intended to be comprehended within the meaning and range of equivalents of the disclosed embodiments.

It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the scope of the appended claims.

I claim:

1. A smart dining table comprising:
a table frame comprising a mounting surface;
an interactive interface comprising:
a housing having a mount for detachably affixing the interactive interface to the mounting surface;
one or more touch-sensitive screens disposed within the housing, the one or more touch-sensitive screens configured to concurrently receive and process simultaneous touch-based inputs from a plurality of users;
a voice input device configured to receive one or more voice-based inputs from the plurality of users;
a payment device configured to receive one or more payment methods from the plurality of users; and
one or more processors configured to process the touch-based inputs, the one or more voice-based inputs and the one or more payment methods to independently provide automated food-ordering assistance to the plurality of users; and
a hygienic surface integrated with the housing and coupled to the one or more touch-sensitive screens, the hygienic surface composed of a transparent, rigid material coated with one or more antimicrobial agents.

2. The table of claim 1, wherein the hygienic surface is formed by coating the transparent material with the one or more antimicrobial agents using a chemical curing process.

3. The table of claim 1, wherein the hygienic surface is formed by coating the transparent material with the one or more antimicrobial agents using a spraying or dipping process.

4. The table of claim 1, wherein the interactive interface is further configured to provide adjustable ambient lighting based on conditions of the surrounding environment.

5. The table of claim 4, wherein the interactive interface is integrated with one or more light sensors to detect the conditions of the surrounding environment.

6. The table of claim 1, wherein the interactive interface is further configured to incorporate one or more sensors and one or more modes of operation for managing power usage.

7. The table of claim 1, wherein the interactive interface is further configured for network communication with an order management system for processing one or more food orders placed by the one or more users.

8. The table of claim 7, wherein the interactive interface is further configured to provide real-time updates on a status of the one or more food orders to the one or more customers.

9. The table of claim 8, wherein the real-time updates are generated based on signals received from the order management system.

10. The smart dining table of claim 1, wherein the payment device is a contactless payment device disposed within the housing and coupled to the hygienic surface.

11. The smart dining table of claim 1, wherein:
the interactive interface further comprises a voice recognition system configured to convert the one or more voice-based inputs into one or more text strings; and
the one or more processors are further configured to parse the one or more text strings to identify matching food products for presentation to the one or more users.

12. A smart dining table interface, comprising:
a housing having a mount for detachably affixing the interactive interface to a mounting surface;
one or more touch-sensitive screens disposed within the housing, the one or more touch-sensitive screens configured to concurrently receive and process simultaneous touch-based inputs from a plurality of users;
a hygienic surface integrated with the housing and coupled to the one or more touch-sensitive screens, the hygienic surface composed of a transparent, rigid material coated with one or more antimicrobial agents;

a processing unit configured to process the touch-based inputs and one or more voice-based inputs from the plurality of users;

a feedback module configured to independently provide automated food-ordering assistance to the plurality of users based on the touch-based inputs and the one or more voice-based inputs; and a payment module configured to process one or more payments received from the plurality of users.

13. The interface of claim 12, wherein the hygienic surface is composed of glass.

14. The interface of claim 12, further comprising a voice recognition system configured to process voice-based inputs from the one or more users.

15. The interface of claim 12, further comprising an order management module configured to process one or more food orders over a network.

16. The interface of claim 15, further comprising a notification unit configured to generate status updates corresponding to the one or more food orders based on signals received by the order management module.

* * * * *